United States Patent [19]

Carder et al.

[11] Patent Number: 5,540,532
[45] Date of Patent: Jul. 30, 1996

[54] APPARATUS FOR MARINE CARGO CONTAINER HANDLING AND STORAGE

[75] Inventors: Frank B. Carder, Darien; Herman G. Wolffenbuttel, Westport; P. Robert Breuer, Stamford, all of Conn.

[73] Assignee: Transact International, Inc., Darien, Conn.

[21] Appl. No.: 151,370

[22] Filed: Nov. 12, 1993

[51] Int. Cl.[6] ................................ B65G 1/04
[52] U.S. Cl. ................ 414/284; 414/282; 414/279; 414/392
[58] Field of Search ................ 414/390, 391, 414/392, 342, 399, 279, 284, 282, 281, 277, 273; 187/222; 211/191

[56] References Cited

U.S. PATENT DOCUMENTS

| | | | |
|---|---|---|---|
| 3,417,879 | 12/1968 | Gough | 214/16 |
| 3,800,963 | 4/1974 | Holland | 214/16.4 A |
| 3,818,852 | 6/1974 | Lewis et al. | 114/72 |
| 3,866,767 | 2/1975 | Zollinger et al. | 214/16.4 B |
| 4,155,462 | 5/1979 | Bender | 211/191 X |
| 4,252,217 | 2/1981 | Benjamin | 187/9 R |
| 4,265,582 | 5/1981 | Theobald | 414/279 |
| 4,273,494 | 6/1981 | Swain et al. | 414/266 |
| 4,459,078 | 7/1984 | Chiantella et al. | 414/284 X |
| 5,067,871 | 11/1991 | Hilber | 414/284 X |
| 5,149,240 | 9/1992 | Di Rosa | 414/277 |

FOREIGN PATENT DOCUMENTS

| | | | |
|---|---|---|---|
| 442000 | 8/1991 | European Pat. Off. | 414/279 |
| 4-243709 | 8/1992 | Japan | 414/392 |
| 912045 | 12/1962 | United Kingdom | 414/392 |
| 2118157 | 10/1983 | United Kingdom . | |

OTHER PUBLICATIONS

Transact International Brochure entitled "Marine Container Cargo Transfer Systems", 6 pages, no date.

*Primary Examiner*—David A. Bucci
*Assistant Examiner*—Stephen Gordon
*Attorney, Agent, or Firm*—St. Onge Steward Johnston & Reens

[57] ABSTRACT

An apparatus and method for handling and storing marine containers transports containers from below using a shuttle that is movable sideways from an elevating cradle in an elevating transfer vehicle. The shuttle has four lifting devices that engage ISO fittings in the container from below. The shuttle can lift a container and travel into a bay of a large storage rack. The lifting devices then lower the container onto supporting brackets that share the ISO fitting with the lifting devices. The shuttle can move the containers within the storage rack, or to a portal where it can be temporarily stored or picked up immediately by a ground vehicle. The system also includes a dock crane buffer and an automated guided vehicle system.

22 Claims, 8 Drawing Sheets

APPARATUS FOR MARINE CARGO CONTAINER HANDLING AND STORAGE

BACKGROUND OF THE INVENTION

1. Field of the Invention

This invention relates to a system and method for handling and storage of marine cargo containers providing higher throughput rates than has been possible in the past, and permitting quick retrieval of stored containers for delivery to a marine vessel or a land carrier, thereby minimizing delays and unnecessary use of dock and cargo loading space associated with prior art methods of storing and handling marine containers.

2. Discussion of the Prior Art

Marine containers for shipment of cargo are generally rectangular structural containers that are provided with ISO fittings at each of their upper and lower corners. Marine containers are of various lengths, typically 20, 24, 30, 40, or 45 feet. These different lengths of containers are normalized when evaluating marine cargo container storage to a twenty foot equivalent unit ("TEU"). The conventional methods and equipment for handling and storage of marine containers use overhead cranes having a spreader with hooks, which hooks fit into and engage openings in the ISO fittings at the upper corners of the container. Thus, for example, in handling inbound marine containers, a dock crane will lift such containers from the deck or hold of a marine vessel and deliver them to a truck. The truck will then transport the container to a storage area, where it is carried by a transtainer (a rail guided or rubber tired overhead straddle crane), and stacked on top of other such containers. Containers stacks commonly contain as many as six such containers, all stacked one on top of the other. Such stacking is possible because the containers are structural elements, and they are typically stacked such that the ISO fittings of an upper container are seated on and supported by the ISO fittings of the container beneath it.

The stored container will then be retrieved from storage when the overland carrier, such as a truck or railway car, arrives and is ready to receive the container. The retrieved container is re-hooked to the transtainer, and then lifted and carried by the transtainer to a truck loading site, where it is then mounted to a truck bed.

It is to be appreciated that in order to retrieve a selected container, that it may be necessary to move some five other containers in order to obtain access to the desired container, i.e., when the desired container is at the bottom of a stack of six containers. This shuffling of containers is time inefficient and creates additional problems in tracking the location of the containers that were moved; alternatively, it is then necessary to replace the five containers into their original stack location so that they remain in their original assigned location.

The same procedures will generally apply when containers are moving in the reverse direction, i.e., when containers are being delivered to a marine terminal by ground transportation, for storage and subsequent loading on a marine vessel for overseas transport. Thus the container will be picked up from the bed of the truck, stored in the storage area, and then retrieved for loading to a marine vessel.

It has been proposed to automate the storage of marine containers, however, to date, no such system has provided an integrated system and method for handling and storage of marine containers to provide completely automated handling of the containers. Moreover, no such automated system has provided an apparatus and method providing random or near random access to the marine containers in the storage area, so that the containers can be rapidly retrieved on demand.

In the field of air cargo handling systems, which involves the handling of air cargo containers, which have a thin aluminum base lacking structural support, several cargo bin handling systems using a random access storage system have been proposed and successfully implemented.

It has also been known in general in connection with warehousing of goods at their location of manufacture, to store pallets of warehoused materials in open frameworks allowing near random access to the stored pallets, for example, as disclosed in U.S. Pat. Nos. 4,273,494 and 3,417,879. However, heretofore, these types of systems have not been used or proposed in connection with marine container storage, due to the unique difficulties of handling such containers.

OBJECTS OF THE INVENTION

It is an object of the present invention to provide a system and method for the handling of marine cargo containers that permits automated handling and storage of such marine containers. It is an object of the invention to provide such a system and method that permits near random access to stored containers for prompt retrieval.

It is an object of the invention to provide such a system and method to substantially increase the speed of retrieval and handling, to permit quicker loading and unloading, of marine cargo containers to be located in storage. It is an object of the invention to substantially reduce labor costs associated with handling of marine cargo containers.

It is an object of the invention to provide such a system and method to substantially increase the speed of retrieval and handling, to permit quicker loading and unloading, of marine cargo containers at ground transport loading areas, thus permitting shorter periods for loading or unloading of such containers, and thereby increasing the number of ground transport vehicles that can be loaded or unloaded during a given time period.

Other objects, aspects and features of the present invention in addition to those mentioned above will be pointed out in or will be understood from the following detailed description provided in conjunction with the accompanying drawings.

SUMMARY OF THE INVENTION

The objects of the invention are achieved by a system for marine cargo container handling and storage including two principal subsystems, namely, a storage rack having an overhead portal shuttle system, and an elevating transfer vehicle subsystem for moving a container within the storage rack.

The storage rack comprises a plurality of vertically and horizontally located bays. Each bay is provided with supporting brackets for supporting the container at four lower corners of the container, preferably by engaging the bottom apertures in the ISO fittings at the lower corners of the marine containers. Preferably, the supporting brackets are provided with upwardly extending pins for engaging an outer portion of the bottom apertures of the ISO fittings.

The bays in the storage rack are preferably oriented to receive the containers longitudinally, i.e. sideways in the bay. The bays preferably have a depth sufficient to store two containers, i.e., there are two container positions in each bay.

The portal crane system has an overhead lifting shuttle crane for lifting or depositing the container from or to a vehicle, such as the automated transport system or a truck, located in a loading/unloading zone. The overhead portal shuttle conveys the container between the loading/unloading zone and a portal buffer area. The portal buffer area provides a temporary storage location of containers as they are being stored to or removed from the storage rack, pending availability of the elevating transfer vehicle needed to move the container to its storage destination.

An elevating transfer vehicle, described in greater detail below, has access to and is movable to extend laterally into the portal buffer area to remove or place a container in the portal buffer area, respectively for delivery to a storage bay in the storage rack, or for pickup by the portal overhead crane and delivery to a truck or other ground transport.

The elevating transfer vehicle comprises a movable carriage having a cradle which can be lifted or lowered as desired, and a shuttle that can be moved laterally in and out of the cradle to extend into a bay in the storage rack. The shuttle is equipped to receive a container, and in particular has lifting devices that engage the ISO fittings, and in particular inner portions of bottom apertures thereof, at the lower corners of the container. The lifting devices can lift the container above the supporting brackets of the storage rack so that the container can be placed in, and removed from, a storage bay without interference with the storage rack by the lateral movement of the shuttle. The shuttle can also load and unload a container at the storage rack portal by the same handling method.

The movable shuttle in the cradle comprises a framework, a plurality of wheels located adjacent ends of the framework, and an electric motor operably connected to the wheels to drive the wheels to move the shuttle to extend laterally from the cradle. Preferably, the cradle and storage rack are provided with rails along lateral sides of each bay for receiving and supporting the shuttle wheels.

In some situations, where a container is being transferred to or from a dockyard automatic guided vehicle ("AGV"), the shuttle may transfer the container directly to or from the AGV without the intermediate step of depositing the container at the portal buffer area for transfer to the overhead lifting shuttle.

Preferably, a system for wireless communication and control of the elevating transfer vehicle is also provided. A container tracking system is also preferably provided, and comprises digital recording apparatus for recording position information received from the position information transmitting means and for recording information identifying a container located at a position identified by the position information, and means for retrieving recorded container identifying and position information.

A method of handling marine containers having fittings at four lower corners of the container, comprises the steps of: transporting the container by supporting the container from below on support brackets provided in a shuttle vehicle, and storing the container by locating the shuttle vehicle in a selected bay in a storage rack and lowering the shuttle vehicle support brackets until the container is supported by storage rack support brackets. The shuttle vehicle support brackets are located to support a portion of the container fittings and the storage rack support brackets are located to support another portion of the container fittings. At least two of the shuttle vehicle support brackets are fitted upwardly into apertures in the container fitting and at least two of the storage rack support brackets are fitted upwardly into the same or different apertures in the container fittings. Removal of the container from the bay involves the steps of: locating the shuttle vehicle in the bay below the container; raising the shuttle vehicle support brackets to lift the container off of the storage rack support brackets; and removing the shuttle vehicle from the bay.

BRIEF DESCRIPTION OF THE DRAWINGS

The present invention may be more clearly understood from the following description of a specific and preferred embodiment read in conjunction with the accompanying schematic and detailed drawings; wherein.

It should be understood that the drawings are not necessarily to exact scale and that certain aspects of the embodiments, may be emphasized for clarity of the invention. Actual embodiments, or installations thereof may differ, depending upon the particular location or application for which the marine cargo handling and storage system is designed.

DETAILED DESCRIPTION OF DRAWINGS

Referring to FIGS. 1–14, and wherein like numbers in different drawing figures refer to the same elements, a system 10 for marine cargo container handling and storage includes a storage rack 40 having a storage rack portal 60; and an elevating transfer vehicle 80 for moving a container 12 within the storage rack 40.

Referring now to FIGS. 1, 2, 8, 9, 10 and 11, the storage rack 40 comprises a plurality of vertically and horizontally located bays 42 formed by metal beams 44. Each bay 42 is provided with supporting brackets 46 for supporting container 12. Container 12 is a conventional marine container, and may be of any length. Container 12 has four lower corners 14, each provided with ISO fittings 16. ISO fittings 16 each have a bottom aperture 18 therein in the lower faces thereof.

Preferably, the supporting brackets 46 are provided with at least two, and preferably four upwardly extending pins 48 for locating in an outer portion 50 of the bottom apertures 18 of the ISO fittings.

Figure 1:
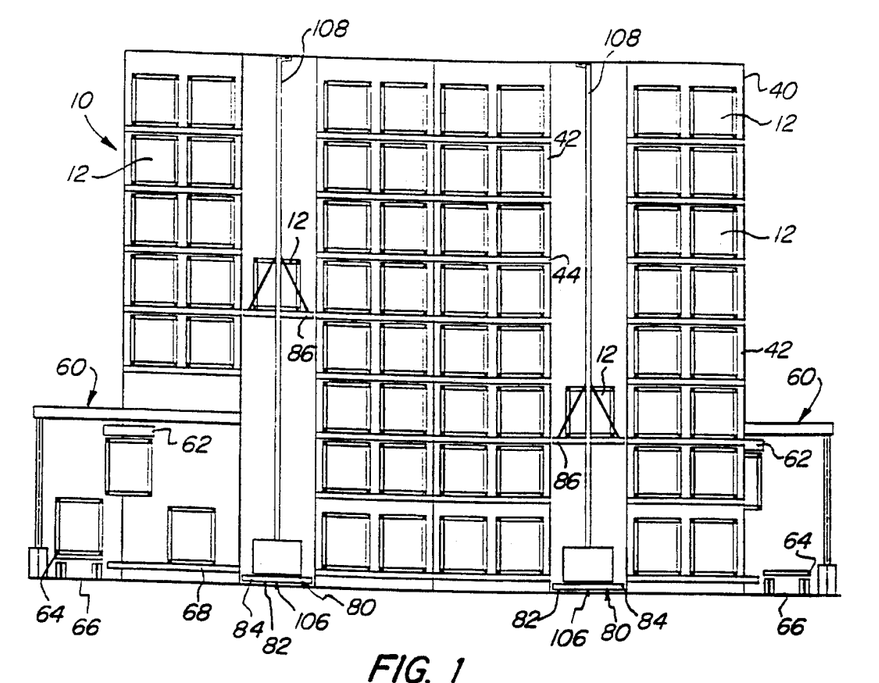
FIG. 1 is a cross-sectional schematic view showing an embodiment of an elevating transfer vehicle and storage rack of the apparatus of the invention.
Figure 2:
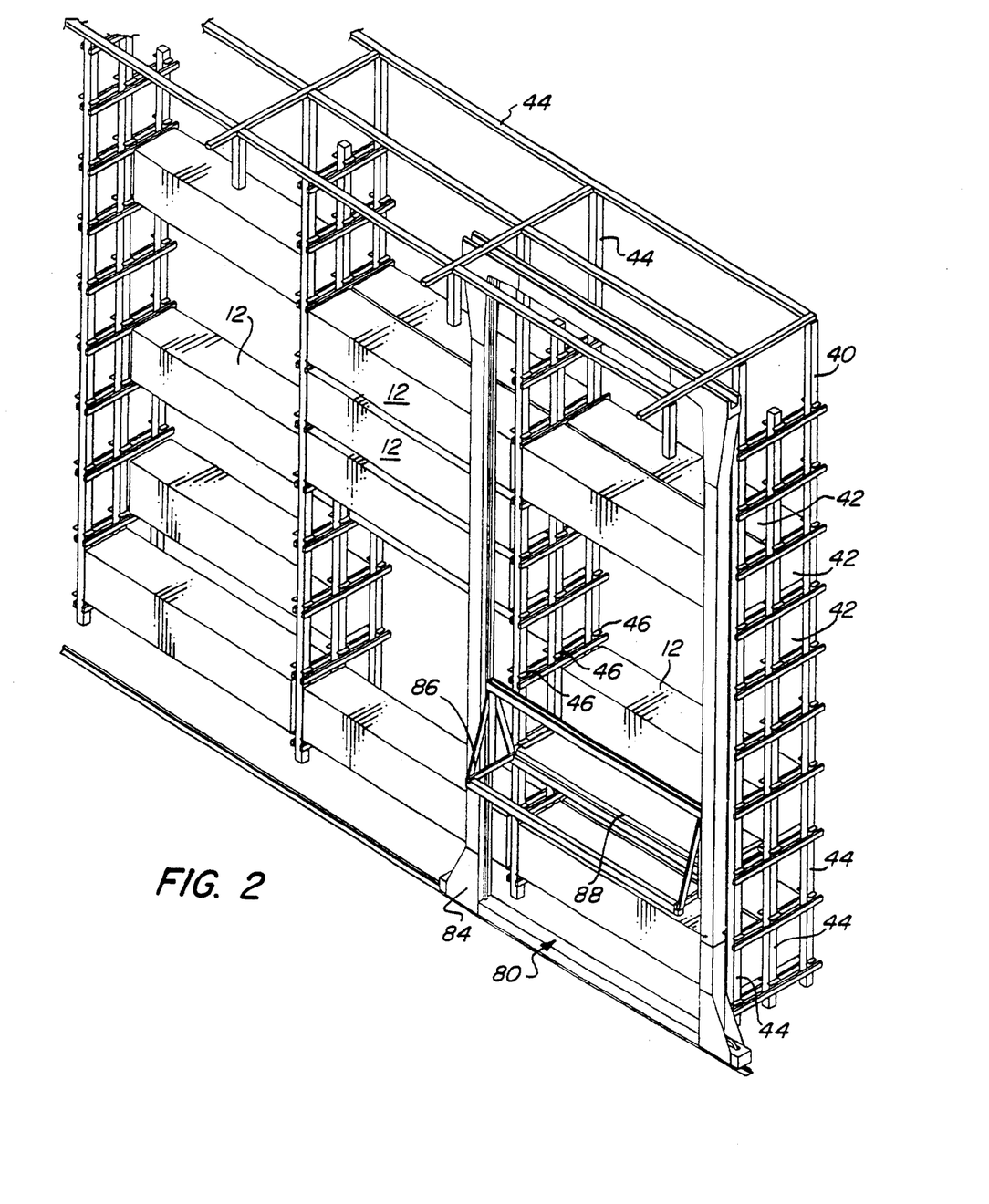
FIG. 2 is a perspective breakaway view of an embodiment of an elevating transfer vehicle and a storage rack of the apparatus of the invention.

The bays 42 in the storage rack 40 are preferably oriented to receive the containers 12 longitudinally, i.e. sideways in bays 42. The bays 42 preferably have a depth sufficient to store two containers 12, thus, there are two container positions with the necessary supporting brackets 46 at each position in each bay 42. The storage rack 40 preferably is a vertical stack of from six to twelve bays 42. The number of bays 42 in a horizontal direction is determined as necessary to store the expected container traffic.

Preferably, there are two such storage racks on either side of a lane 82 traversed by elevating transfer vehicle 80. As can be seen in FIGS. 1, 10, 11 and 12, multiple sets of opposing storage racks 40 facing each other across a lane 82 may be located together in rows.

Figure 10:
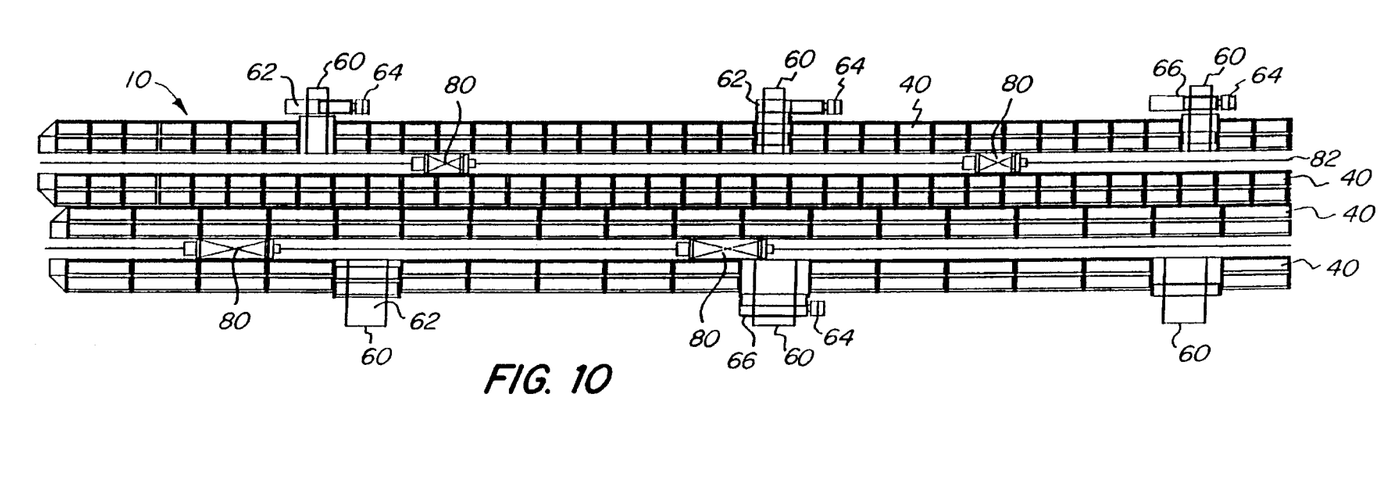
FIG. 10 is a top plan view of an embodiment of the storage rack and apparatus in accordance with the invention shown schematically in FIG. 1.
Figure 11:
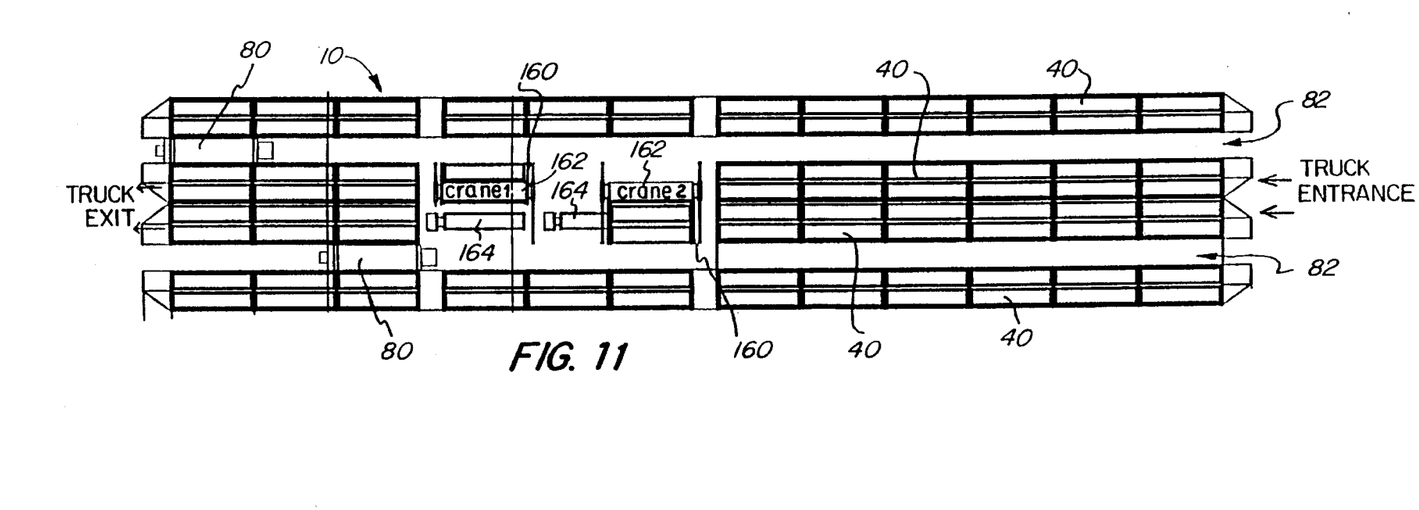
FIG. 11 is a top plan view of an alternate embodiment of a storage rack and apparatus in accordance with the invention.
Figure 12:
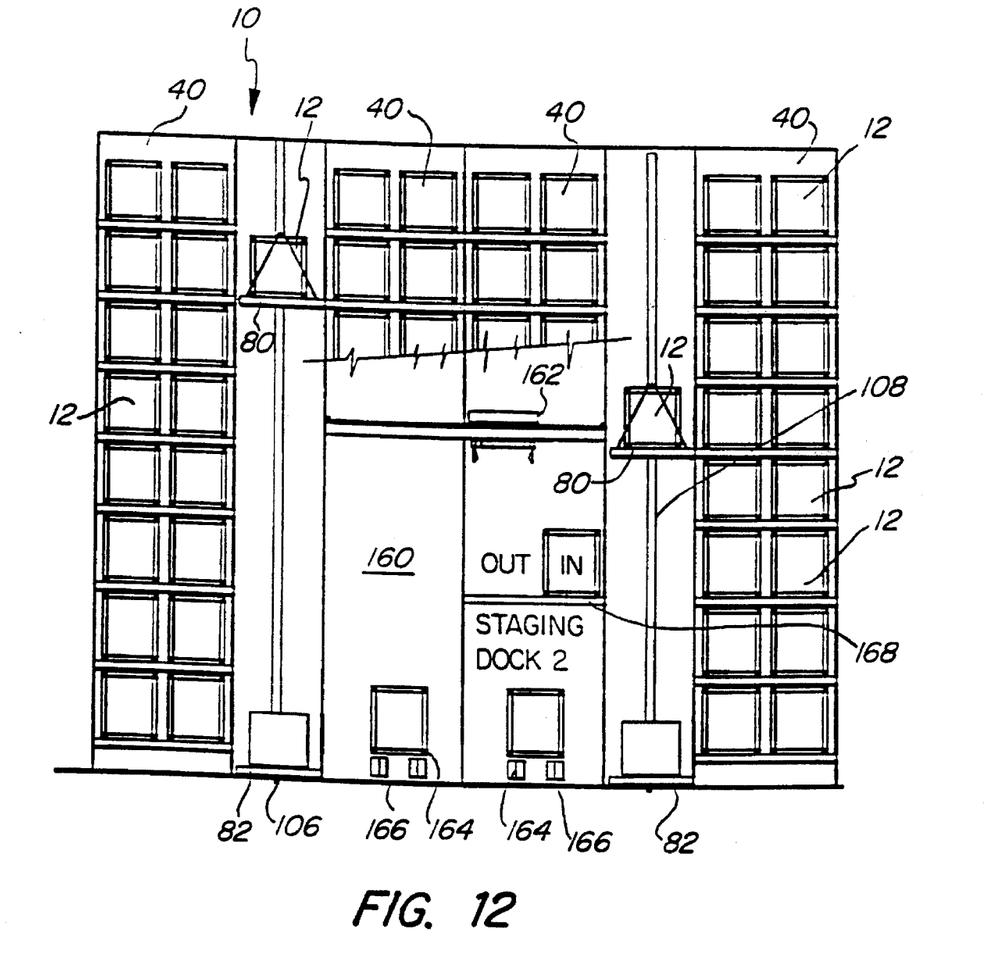
FIG. 12 is a cross-sectional schematic view of the storage rack and apparatus of FIG. 11.

Containers are loaded to the storage rack 40 through a storage rack portal 60. There may be one or more such portals 60 for each length of storage rack 40. As can be seen in FIGS. 1 and 10, portals 60 may be located for interfacing with trucks or AGVs arriving at the outer walls of storage rack 40. Alternatively, as shown in FIGS. 11–12, a portal 160 may be situated with trucks or AGVs passing below the storage rack 40. Portal 60 thus provides a side-to-side overhead portal shuttle, while the overhead portal shuttle of portal 160 provides a more substantial vertical component as well. Portals 60, 160 are preferably located in a central part of each length of their storage racks and each has an overhead portal shuttle 62, 162 for lifting or depositing a container 12 from or to a vehicle 64, such as a truck or AGV, located in their respective loading/unloading zones 66, 166. The overhead portal shuttles 62, 162 convey a container 12 between their respective loading/unloading zones 66, 166 and their respective portal buffer areas 68, 168. The portal buffer areas 68, 168 provide a temporary storage location for containers 12 as they are being stored to or removed from the storage rack, pending availability of the equipment needed to move the container 12 to its immediate destination.

Figure 13:
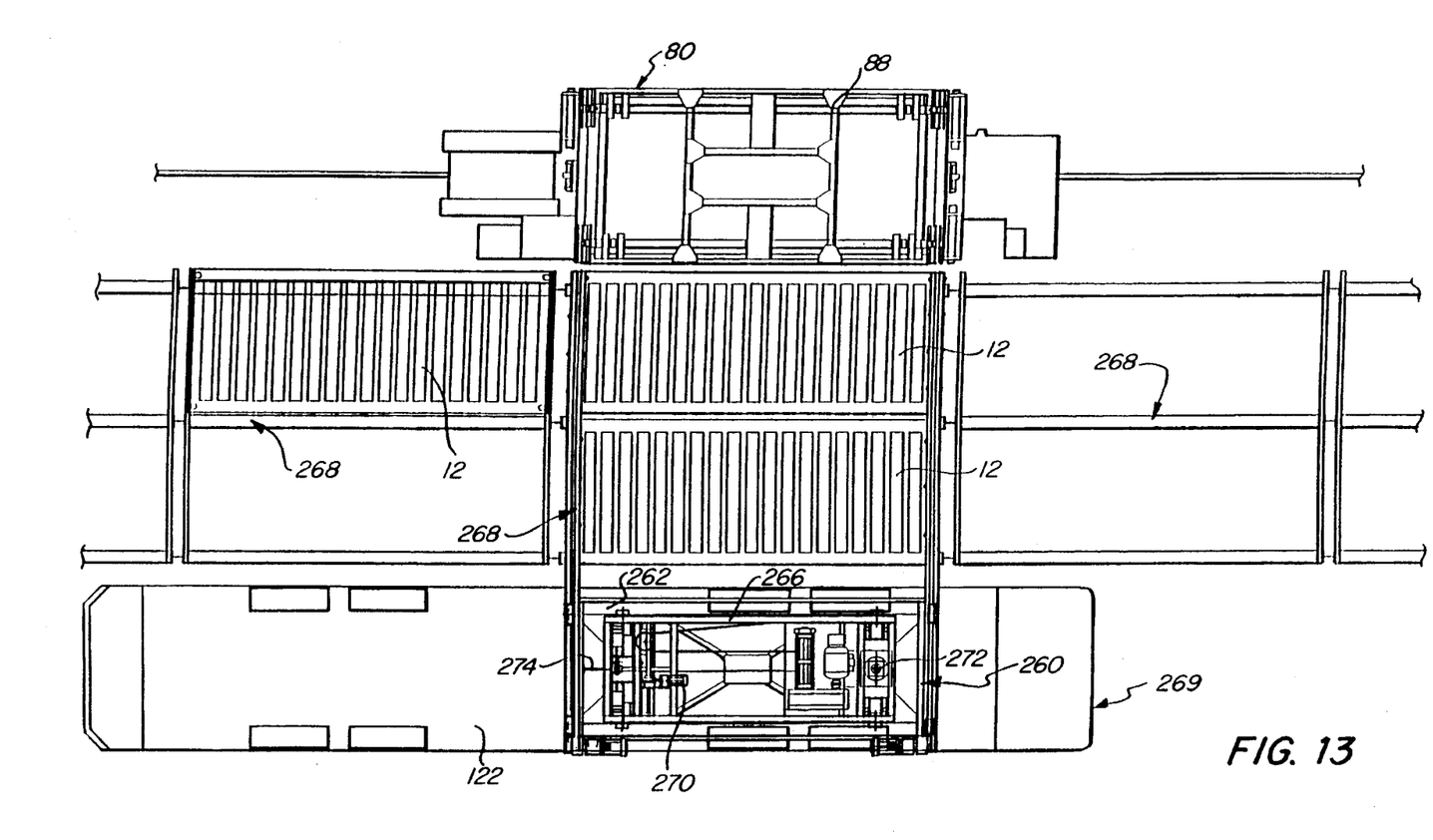
FIG. 13 is a top plan view of an overhead portal shuttle system in accordance with the invention.
Figure 14:
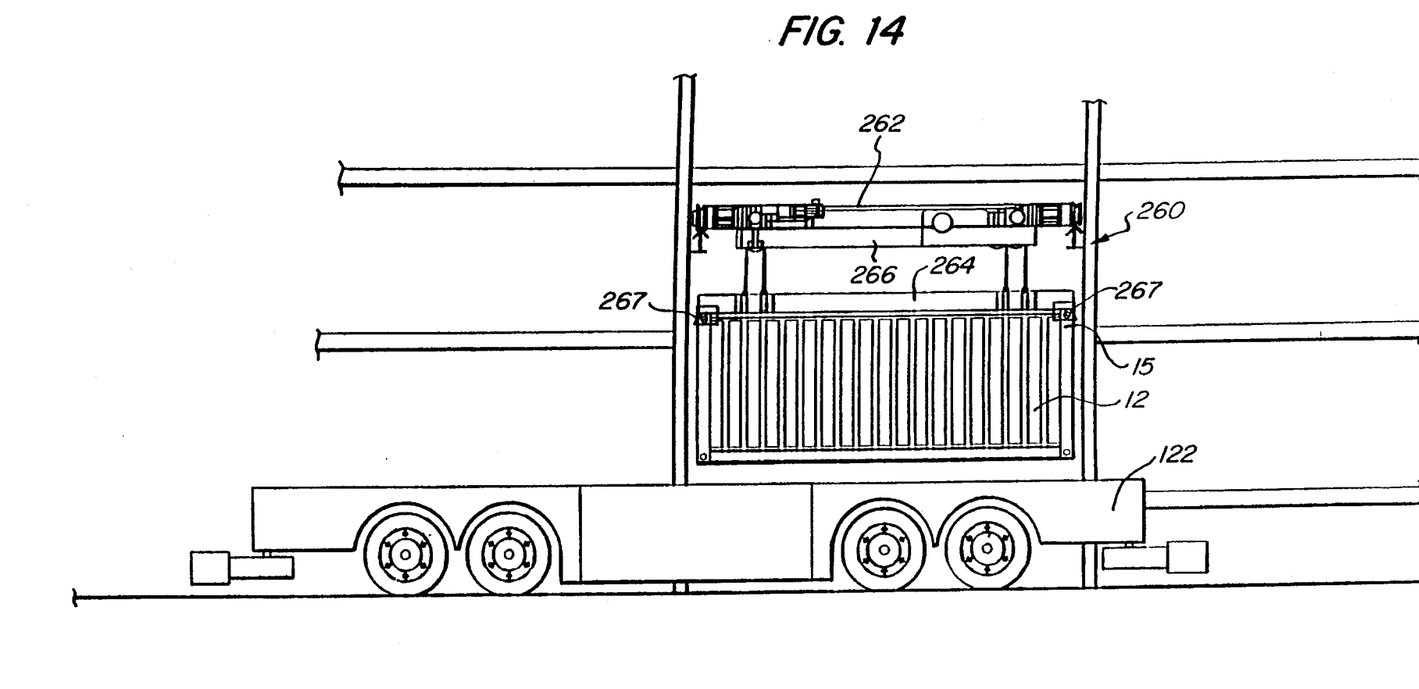
FIG. 14 is a side elevation view of the overhead portal system of FIG. 13.

Referring to FIGS. 13–14, an overhead portal shuttle 260 is shown in detail. Portal shuttle 260 includes a rail guided carriage 262 supporting a hoist frame 266 which holds a spreader 264. Spreader 264 has twist lock fittings 267 that engage ISO fittings 15 at the four upper corners of container 12. Spreader 264 is supported by cables and a winch provided on hoist frame 266 for lifting the spreader 264. Portal shuttle 260 is movable between positions above the portal buffer area 268 and the loading/unloading zone 269.

Portal shuttle 260 has positioning adjusting means to accommodate the possibility that a truck located in the loading/unloading zone 269 will not be located precisely in position and parallel to the portal shuttle 260. These positioning adjusting means include a motor driven lead screw 270 and corresponding pivot 272 permitting angular correction of the hoist frame 266 relative to the position of a truck. Preferably, hoist frame 266 can be adjusted plus or minus three degrees from dead center. Another positioning adjusting means includes a motor driven lead screw 274 permitting forward and backward positioning of the hoist frame 266. These two positioning means provide substantial ability to accommodate parking errors by a truck or AGV.

An elevating transfer vehicle 80, described in greater detail below, has access to and is movable to extend laterally into the portal buffer areas 68 and 168 to remove a container 12 in the portal buffer areas 68, 168 for delivery to a storage bay 42 in the storage rack 40. Elevating transfer vehicle 80 will also operate to deliver a container 12 to portal buffer areas 68, 168 from a bay 42, for pickup by the portal overhead crane 62 and delivery to a truck or other ground transport vehicle.

Figures 3, 4:
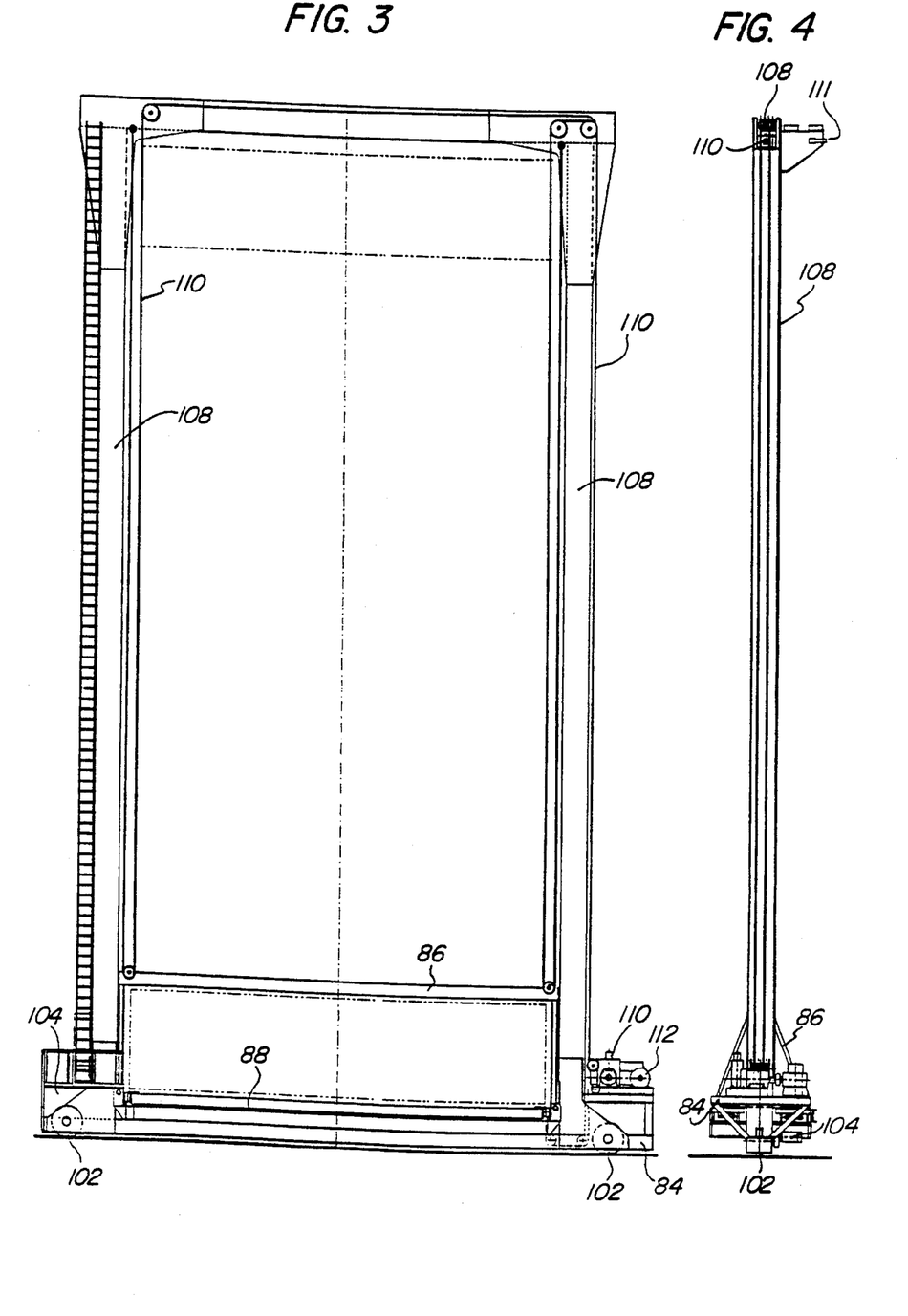
FIG. 3 is a side elevation view of an embodiment of an elevating transfer vehicle of the apparatus of the invention.
FIG. 4 is an end elevation view of the elevating transfer vehicle of FIG. 3.
Figure 5:
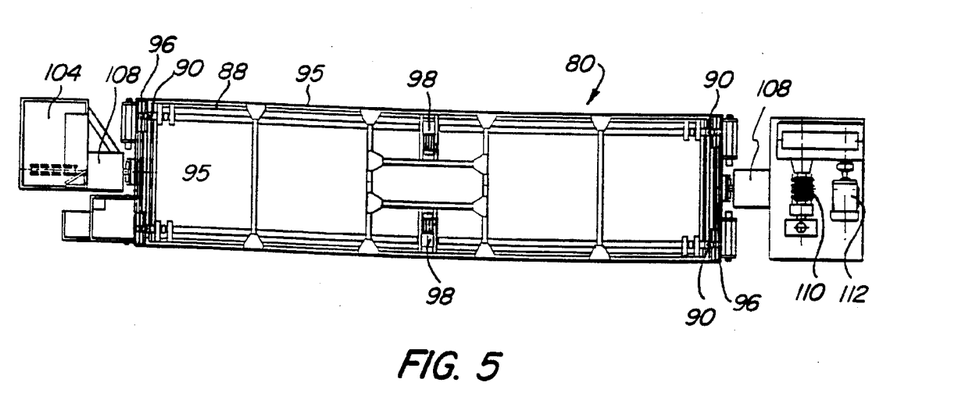
FIG. 5 is a top plan view of the elevating transfer vehicle of FIG. 3.

The elevating transfer vehicle 80 comprises a movable carriage 84 having a cradle 86 which can be lifted or lowered as desired, and a shuttle 88 that can be moved laterally in and out of the cradle 86 to extend into a bay 42 in the storage rack 40.

The shuttle 88 is equipped to receive a container 12, and in particular has lifting devices 90 that engage the ISO fittings at the lower corners of the container 12. The lifting devices 90 may comprise pneumatic or hydraulic cylinders, screw actuators, or other heavy duty lifting equipment capable of lifting a fully loaded marine container 12 upwardly by about 10 centimeters. Lifting devices 90 lift the container 12 above the supporting brackets 46 of the storage rack 40 and the container 12 can therefore be placed in, and removed from, a storage bay 42, without interference with the storage rack 40, by the lateral movement of the shuttle 88. The shuttle 88 can also load and unload a container 12 at the storage rack portal 60. Preferably, the lifting devices 90 are provided with upwardly extending pins 92 for locating in an inner portion 94 of the bottom apertures 18 of the ISO fittings 16.

Alternatively, it would be possible to provide shuttles 88 with devices such as a spreader with twist-lock fittings to engage upper ISO fittings 15 of containers 12, and the rest of the system would be generally as heretofore described, except that the lifting and lowering of the container would be from above instead of from underneath.

Figure 6:
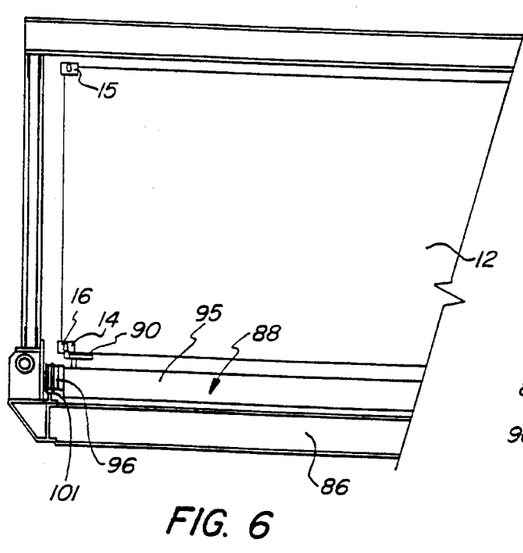
FIG. 6 is a detail side elevation view of the shuttle located in the cradle of the elevating transfer vehicle of FIG. 3.
Figure 7:
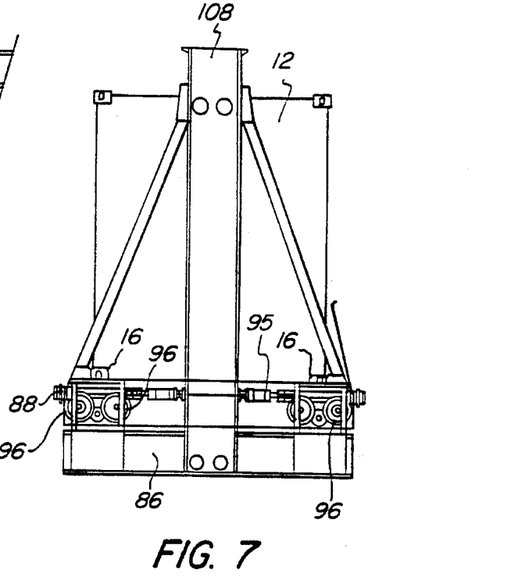
FIG. 7 is an end elevation view of the shuttle of FIG. 6.
Figure 8:
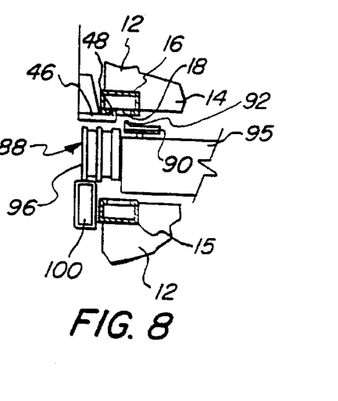
FIGS. 8 and 9 are detail cross-sectional views of a shuttle of FIG. 6 as it performs the step of lifting a container to remove it from a storage rack.
Figure 9:
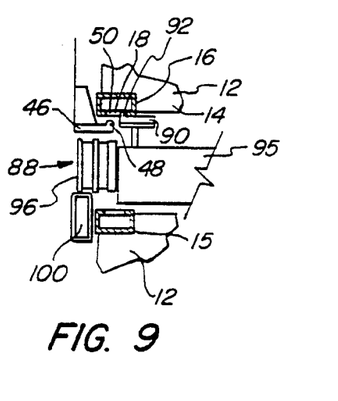

The movable shuttle 88 in the cradle 86 comprises a framework 95, a plurality of wheels 96 located adjacent ends of the framework 95, and at least one electric motor 98 operably connected by a drive shaft and gear train to the wheels 96 to drive the wheels 96 to move the shuttle 88 to extend laterally from the cradle 86. Preferably, the storage rack 40 is provided with rails 100 along lateral sides of each bay 42 for receiving and supporting the shuttle wheels 96. Cradle 86 similarly has rails 101 for supporting shuttle wheels 96.

The carriage 84 of the elevating transfer vehicle has at least one carriage wheel 102 at each end of the carriage and an electrical motor 104 coupled to the carriage wheels 102 for driving the carriage wheels 102 to move the elevating transfer vehicle 80 along lane 82. Lane 82 is preferably a rail 106 and wheels 102 rest on and are guided by rail 106 to insure the consistent position of the elevating transfer vehicle relative to the position of the storage rack 40.

At least one vertically extending mast 108 extends from the carriage 84 to a height sufficient to permit access to a highest bay 42 in the storage rack 40. The cradle 86 is movably mounted to the mast 108 by a pulley and wire cable apparatus 110. An electric motor 112 is operably connected to the pulley and cable apparatus 110 to move the cradle 86 upwardly and downwardly along the mast 108.

The shuttle 88 can move freely anywhere within its assigned area. Since the containers 12 may be stored double deep in bays 42, the shuttle will be used to occasionally move a front container to another location before removing a rear container in a bay 42. The shuttle will have an average response time to retrieve a container in a bay which substantially improves over conventional systems.

Preferably, a system for wireless communication and control of the elevating transfer vehicle 80 is provided, which system may include vertical and horizontal position encoders 111 located on the elevating transfer vehicle 80 for determining the position of the cradle 86 and encoding vertical and horizontal position information; means for transmitting encoded vertical and horizontal position information from the elevating transfer vehicle 80 to a control unit; means for positioning the elevating transfer unit 80 and the cradle 86 responsive to vertical and horizontal position inputs; and means for transmitting vertical and horizontal position inputs from the control unit to the positioning means. This system permits remote operation of the shuttle to retrieve containers 12 stored in rack 40.

Preferably, a container tracking system is also provided, and comprises digital recording apparatus for recording position information received from the position information transmitting means and for recording information identifying a container 12 located at a position identified by the position information, and means for retrieving recorded container identifying and position information. Such a system will keep track of each container if it is moved into different bays 42 in the storage rack 40 when needed to obtain access to a rear container in a bay.

An automated self-propelled vehicle 122, that can be controlled by various methods, including, an on-board computer, remote control by infrared communication with a control unit, or other automated guidance systems as are known in the art can be used in conjunction with the invention.

A method of handling marine containers 12 having fittings 16 at four lower corners of the container 12, comprises the steps of: transporting the container 12 by supporting the container 12 from below on support brackets 90 provided in a shuttle 88, and storing the container by locating the shuttle 88 in a selected bay 42 in a storage rack 40 and lowering the shuttle support brackets 90 until the container 12 is supported by storage rack support brackets 46. The shuttle support brackets 90 support a portion of the container fittings 16 and the storage rack support brackets 46 support another portion of the container fittings 16. At least two of the shuttle support brackets 90 are fitted upwardly into apertures 18 in the container fitting 16 and at least two of the storage rack support brackets 46 are fitted upwardly into the same or different apertures 18 in the container fittings 16.

Preferably, the storage rack support brackets 46 are each provided with an upwardly extending pin 48 for fitting into an outer portion of the bottom apertures 18 during lowering of the container 12 onto the storage rack support brackets 46; and the shuttle support brackets 90 also are each provided with an upwardly extending pin 92 for fitting into an inner portion of the bottom apertures 18 during lowering of the container 12 onto the storage rack support brackets 46. Removal of the container 12 from the bay 42 involves the steps of: locating the shuttle 88 in the bay 42 below the container 12; raising the shuttle support brackets 90 to lift the container 12 off of the storage rack support brackets 46; and removing the shuttle 88 from the bay 42.

As those skilled in the art will recognize, however, the invention is not necessarily limited thereto and the inventive concept may be implemented in other embodiments.

As is apparent from the above description, the present invention provides unique advantages in the handling and storage of marine containers, providing the first integrated system for efficiently transporting, locating, and retrieving such containers. The invention provides a high density marine container storage system that is particularly useful in crowded ports where, in order to expand container traffic, additional port space 1–17 is required. The invention permits an expansion of port traffic without acquisition of costly real estate.

We claim:

1. A system for marine cargo container handling and storage, comprising:

a storage rack having a storage rack portal and a plurality of vertically and horizontally located bays for receiving marine cargo containers, each said bay being provided with supporting brackets for supporting one of said containers at four lower corners of the container; and an elevating transfer vehicle having
means for moving said elevating transfer vehicle adjacent to said storage rack,
a cradle,
means for lifting said cradle provided in said elevating transfer vehicle, and
a shuttle receivable in said cradle and being movable to extend laterally from said cradle to extend into a bay of said storage rack, and being provided with lifting devices for lifting the container above said supporting brackets, said lifting of the container by said lifting devices and lateral movement of said shuttle between said cradle and said bay permitting transfer of the container from said cradle into said bay and removal of the container from said bay to said cradle, and further permitting loading and unloading of the container to and from said shuttle at said storage rack portal;

said portal having an overhead lifting portal shuttle for lifting the container and conveying the container between a loading zone and a portal buffer area; said elevating transfer vehicle shuttle having access to and being movable to extend laterally into said portal buffer area to receive the container and transport the container to said cradle.

2. A system in accordance with claim 1, wherein the container is provided with fittings at said four lower corners thereof, said fittings each having a bottom aperture therein, and said supporting brackets are provided with means for engaging with said bottom apertures, and wherein said lifting devices of said elevating transfer vehicle shuttle can lift the container above said engaging means, whereby the container can be moved in and out of said bay without interference with said storage rack by lateral movement of said elevating transfer vehicle shuttle.

3. A system in accordance with claim 2, wherein said movable shuttle comprises a framework, a plurality of wheels located adjacent ends of said framework, and an electric motor operably connected to a said wheel to drive said wheel to move said elevating transfer vehicle shuttle to extend laterally from said cradle.

4. A system in accordance with claim 3, wherein said means for engaging comprise upwardly extending pins for locating in an outer portion of said bottom apertures, and said lifting devices of said elevating transfer vehicle shuttle are provided with upwardly extending pins for locating in an inner portion of said bottom apertures.

5. A system in accordance with claim 4 wherein said storage rack and said cradle are provided with rails for receiving and supporting said shuttle wheels, said storage rack rails being located along lateral sides of each said bay below said supporting brackets.

6. A system in accordance with claim 1, wherein said portal shuttle comprises a carriage, a hoist frame supported by said carriage, said hoist frame being movable relative to said carriage by positioning adjustment means, said carriage being laterally movable.

7. A system in accordance with claim 2, wherein said elevating transfer vehicle further comprises: a carriage; and wherein said means for lifting said cradle comprises: at least one vertically extending mast extending upwardly from said carriage to a height sufficient to permit access to a highest bay in said storage rack; an electric motor for operation of a pulley and chain apparatus to move said cradle upwardly and downwardly along said mast; and vertical and horizontal position encoders for determining the position of said cradle and encoding vertical and horizontal position information regarding the position of said cradle and wherein said means for moving said elevating transfer vehicle comprises at least one carriage wheel at each end of said carriage and an electrical motor coupled to at least one said carriage wheel for driving said at least one carriage wheel to move said elevating transfer vehicle.

8. A system in accordance with claim 7, further comprising means for wireless communication and control of said elevating transfer vehicle having:

means for transmitting said encoded vertical and horizontal position information from said elevating transfer vehicle to a control unit;

means for positioning said elevating transfer unit and said cradle responsive to vertical and horizontal position inputs from said control unit; and means for transmitting said vertical and horizontal position inputs from said control unit to said positioning means.

9. A system in accordance with claim 8, further including a container tracking system comprising digital recording apparatus for recording position information received from said means for transmitting said encoded vertical and horizontal position information and for recording information identifying a container located at a position identified by said position information, and means for retrieving recorded container identifying and position information.

10. A system in accordance with claim 1, wherein said bays are oriented whereby the containers are received longitudinally in said bays and wherein said bays have a depth sufficient to store two containers.

11. A system in accordance with claim 10, wherein said storage rack is from six to ten bays in vertical height.

12. A marine container storage rack system, comprising:

a storage rack having a plurality of vertically and horizontally located bays for receiving marine containers, each said bay being provided with supporting brackets for supporting one said container at four lower corners of the container;

an elevating transfer vehicle having
means for propelling said elevating transfer vehicle,
a cradle,
means for lifting said cradle provided in said elevating transfer vehicle, and
a shuttle receivable in said cradle and being movable to extend laterally from said cradle to be located in said bays, said shuttle being provided with lifting devices for lifting a said container above said supporting brackets, said lifting of the container by said lifting devices and said lateral movement of said shuttle between said cradle and one said bay permitting placement of the container from said cradle into said one bay and removal of the container from said one bay to said cradle;

a storage rack portal for loading and unloading of the container to and from said shuttle, having an overhead lifting portal shuttle for lifting a container and conveying the container between a loading zone and a portal buffer area; said elevating transfer vehicle shuttle having access to and being movable to extend laterally into said portal buffer area to lift the container with said lifting devices and transport the container to said cradle.

13. A system in accordance with claim 12, wherein said portal shuttle comprises a carriage, a hoist frame supported by said portal shuttle carriage, said hoist frame being movable relative to said portal shuttle carriage by positioning adjustment means, said carriage being laterally movable.

14. A marine container storage rack system in accordance with claim 13, further including a system for wireless communication and control of said elevating transfer vehicle, comprising:

vertical and horizontal position encoders located on said elevating transfer vehicle for determining the position of said cradle and encoding vertical and horizontal position information;

means for transmitting said encoded vertical and horizontal position information from said elevating transfer vehicle to a control unit;

means for positioning said elevating transfer unit and said cradle responsive to vertical and horizontal position inputs from said control unit; and means for transmitting said vertical and horizontal position inputs from said control unit to said positioning means.

15. A marine container storage rack system in accordance with claim 14, further including a container tracking system comprising digital recording apparatus for recording position information received from said means for transmitting said vertical and horizontal position information, and for recording information identifying a container located at a position identified by said position information, and means for selectively retrieving said recorded container identifying and position information to locate a said container.

16. A marine container storage rack system in accordance with claim 12, wherein said movable shuttle comprises a rectangular framework, a plurality of wheels located on ends of said framework, and means for driving a said shuttle wheel to move said elevating transfer vehicle shuttle to extend laterally from said cradle.

17. A marine container storage rack system in accordance with claim 16, further comprising a said container, wherein said lifting devices engage the container at said four lower corners of the container.

18. A marine container storage rack system in accordance with claim 17, wherein the container is provided with fittings at each lower corner thereof, said fittings having a bottom aperture therein, and wherein said storage rack supporting brackets are provided with upwardly extending pins for locating in an outer portion of said bottom apertures.

19. A marine container storage rack system in accordance with claim 18, wherein said lifting devices of said elevating transfer vehicle shuttle are provided with upwardly extending pins for locating in an inner portion of said bottom apertures, whereby the container may be lifted above said supporting brackets by said lifting devices and moved in and out of said bay by the lateral movement of said elevating transfer vehicle shuttle.

20. A marine container storage rack system in accordance with claim 19, wherein said cradle and storage rack are provided with rails for receiving and supporting said shuttle wheels, said storage rack rails being located along lateral sides of each said bay below said supporting brackets.

21. A marine container storage rack system in accordance with claim 20, wherein said elevating transfer vehicle further comprises: a carriage; at least one carriage wheel at each end of said carriage; and wherein said means for propelling said elevating transport vehicle comprises an electrical motor coupled to a said at least one carriage wheel for driving said carriage wheel to move said elevating transfer vehicle adjacent said storage rack; and wherein said means for lifting said cradle comprises at least one vertically extending mast extending upwardly from said carriage to a height sufficient to permit said elevating transfer vehicle shuttle access to a highest bay in said storage rack; and an electric motor for operation of a pulley and chain apparatus to move said cradle and elevating transfer vehicle shuttle upwardly and downwardly along said mast.

22. A system for handling and storage of a marine cargo container having fittings at each lower corner thereof, said fittings each having a bottom aperture therein, comprising:

a storage rack having a plurality of vertically and horizontally located bays for receiving a plurality of said containers, each said bay being provided with supporting brackets for supporting the container at four lower corners of the container, said supporting brackets being provided with upwardly extending pins for locating in an outer portion of said bottom apertures of the container fittings, said storage rack having load bearing rails located along lateral sides of each said bay below said supporting brackets, said storage rack having a storage rack portal, said storage rack portal having an overhead lifting shuttle crane for lifting the container from a vehicle and conveying the container to a portal area, and for removing the container from said portal area and depositing the container on a vehicle; and an elevating transfer vehicle having
means for moving said elevating transfer vehicle adjacent to said storage rack,
a cradle having rails therein,
means for lifting said cradle provided in said elevating transfer vehicle, and
a shuttle receivable in said cradle and movable to extend laterally from said cradle to be located in said bays, said movable shuttle having a rectangular framework, a plurality of wheels located on ends of said rectangular framework, said wheels being ridable on said rails in said cradle and said rails in said bays, and an electric motor for driving one said wheel to move said elevating transfer vehicle shuttle to extend laterally from said cradle, said elevating transfer vehicle shuttle being further provided with lifting devices for lifting the container above said supporting brackets, said lifting devices having upwardly extending pins for locating in an inner portion of said bottom apertures of said container fittings, whereby the container may be lifted above said supporting brackets by said lifting devices and moved in and out of one said bay by the lateral movement of said elevating transfer vehicle shuttle without interference with said storage rack; and further permitting loading and unloading of the container to and from said elevating transfer vehicle shuttle at said storage rack portal by extending laterally into said portal area to lift or lower the container with said lifting devices.

* * * * *